United States Patent
Emery et al.

(10) Patent No.: US 11,390,756 B1
(45) Date of Patent: Jul. 19, 2022

(54) WATER-BASED AEROSOL COMPOSITION AND METHOD

(71) Applicant: Rust-Oleum Corporation, Vernon Hills, IL (US)

(72) Inventors: Tyler Emery, Milwaukee, WI (US); Matthew Badgley, Spring Grove, IL (US)

(73) Assignee: Rust-Oleum Corporation, Vernon Hills, IL (US)

( * ) Notice: Subject to any disclaimer, the term of this patent is extended or adjusted under 35 U.S.C. 154(b) by 0 days.

(21) Appl. No.: 16/159,999

(22) Filed: Oct. 15, 2018

(51) Int. Cl.
*C09D 5/02* (2006.01)
*C09D 5/08* (2006.01)
*C09D 7/65* (2018.01)
*C09D 167/08* (2006.01)

(52) U.S. Cl.
CPC .............. *C09D 5/021* (2013.01); *C09D 5/024* (2013.01); *C09D 5/08* (2013.01); *C09D 7/65* (2018.01); *C09D 167/08* (2013.01)

(58) Field of Classification Search
CPC ...................................................... C09D 5/021
See application file for complete search history.

(56) References Cited

U.S. PATENT DOCUMENTS

| 4,420,575 | A | * | 12/1983 | Rapaport | ............... C09D 5/021 106/252 |
| 4,518,734 | A | * | 5/1985 | Brouillette | ............. C09D 5/021 524/378 |
| 5,578,669 | A | | 11/1996 | Odawa et al. | |
| 8,415,026 | B2 | | 4/2013 | Fukuike et al. | |
| 2020/0032077 | A1 | * | 1/2020 | Parviainen | ............. C09D 5/022 |

FOREIGN PATENT DOCUMENTS

| CN | 102250540 B | 7/2014 |
| WO | 2018/162801 A1 | 9/2018 |

* cited by examiner

*Primary Examiner* — Vickey Nerangis
(74) *Attorney, Agent, or Firm* — Crawford Maunu PLLC

(57) ABSTRACT

Aspects of the disclosure are directed to a water-based aerosol composition, as well as related methods and resulting films. As may be implemented in accordance with one or more embodiments, a water-based aerosol composition includes a solvent including water, a liquid propellant, and a waterborne alkyd polymer material. The solvent, propellant and waterborne alkyd polymer operate together to propel the water-based aerosol composition onto a surface and cure the alkyd polymer on the surface, therein providing a coating on the surface that inhibits oxidation thereof.

20 Claims, 2 Drawing Sheets

WATER-BASED AEROSOL COMPOSITION AND METHOD

BACKGROUND

Figure 1:
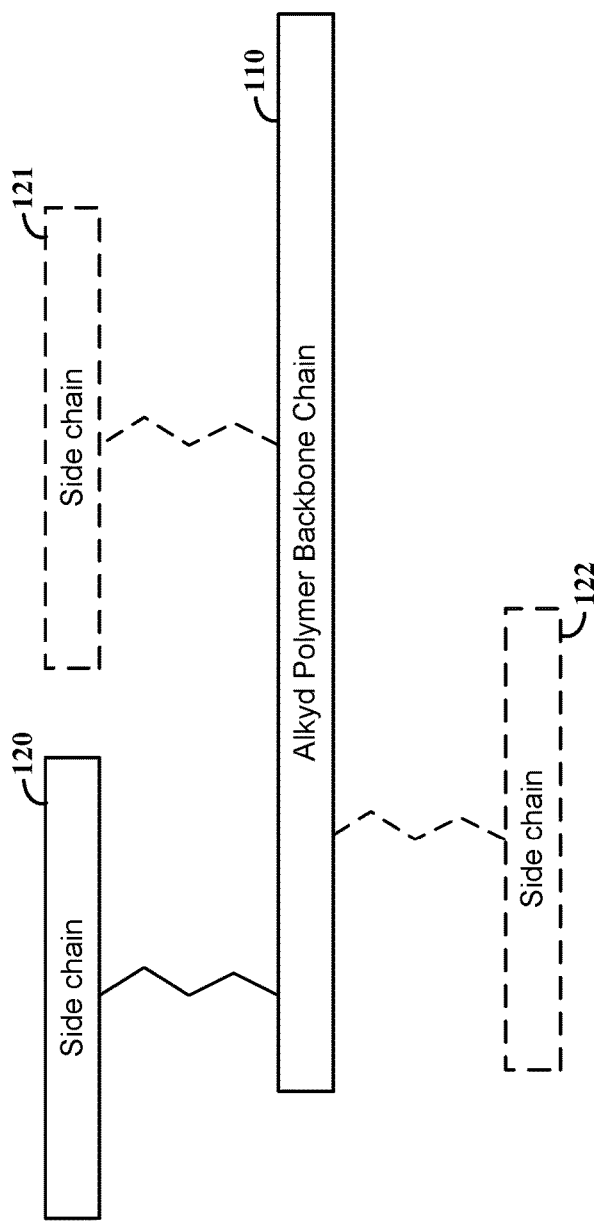

For many applications, it is desirable to provide a coating of material that inhibits oxidation, corrosion or otherwise protects a surface. Such coating applications often involve an aerosol composition having a propellant for propelling coating material onto a surface to be coated. Such a coating may include, for example, a paint resin and other materials. Aerosol paint compositions are useful and convenient, for providing a variety of coatings. Further, such coatings can be used for applying a rust-inhibiting coating.

To provide a desirable surface coating, a solvent is used with the coating material and propelled onto a surface. Solvents are useful for enhancing flow as well as to facilitate proper dispersion of components in the coating material. However, many solvents used in aerosol applications can be challenging to implement in a desirable manner. Water-based solvents can be used to mitigate certain issues, however their ability to provide a smooth, protective coating can be limited.

These and other matters have presented challenges to the formulation and implementation of aerosol compositions, for a variety of applications.

SUMMARY

Various example embodiments are directed to water-based aerosol compositions, their application and their manufacture. Such embodiments may be useful for providing an oxidation-inhibiting coating upon a surface.

As may be implemented in accordance with one or more embodiments, a water-based aerosol composition includes a solvent including water, liquid propellant and a waterborne alkyd polymer material. The waterborne alkyd polymer material may operate with the solvent and propellant to inhibit oxidation upon application to a surface. In some embodiments, the waterborne alkyd polymer material is configured and arranged with the solvent and propellant to, upon delivery of the waterborne alkyd polymer material to a surface via the propellant and subsequent curing of the waterborne alkyd polymer material on the surface, inhibit oxidation of the surface.

Various methods may be implemented with compositions as noted herein. In accordance with one or more embodiments, a method includes utilizing a liquid propellant for spraying a water-based aerosol composition onto a surface. The water-based aerosol composition includes the propellant as well as a solvent including water and a waterborne alkyd polymer material. The water-based aerosol composition is then cured on the surface and used for inhibiting oxidation of the surface therewith. Such an approach may involve utilizing one or more additional aspects as characterized herein, to facilitate flow and cross-linking of the alkyd polymer, related flow of any pigments included therewith, and adhesion thereof to a surface for preventing oxidation.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIG. 1 shows a composition of matter including an alkyd polymer, in accordance with one or more embodiments; and FIG. 2 shows a composition of matter including an alkyd polymer having respective double bond sites for cross-linking, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving water-based materials, such as water-based coatings, that inhibit oxidation. In certain implementations, aspects of the present disclosure have been shown to be beneficial when used in the context of aerosol coatings. While not necessarily so limited, various aspects may be appreciated through a discussion of examples using such exemplary contexts.

According to various example embodiments, aspects of the present disclosure are directed to a stable rust-preventive waterborne aerosol paint with high gloss, self-leveling, low odor, and low Maximum Incremental Reactivity (MIR). In various contexts, such paint obtains protective properties from an oil emulsion (resin) contained in the aerosol. Desirable flow, defoaming, and sag resistance provide a continuous, water-resistant film. Further, the paint adheres to surfaces such as those including steel or aluminum without flash rusting, for a direct to metal (DTM) application. In this context, MIR relates to a maximum change in weight of ozone formed via adding a compound to a base ROG mixture (standard for relative reactivity scales) per weight of added compound, and can be expressed to hundredths of a gram (g 03/g ROC). Such approaches may be carried out with a resin-alkyd polymer core, with application facilitated with a polymeric silicone-free defoamer, nonionic siloxane-type flow enhancer, and a Newtonian polyurethane rheology agent.

Certain embodiments are directed to nonionic paints, with respect to resin stabilization and additives in the paint. It has been recognized/discovered that the nonionic nature of the materials prevents material from being water soluble during a corrosion process, and contributes to preventing ionic mobility for corrosion-inducing elements and compounds, with respect to corrosion-preventing resins used herein to mitigate or prevent the migration of water and ions through a coated film. Enhancing such resin utilized for providing such protective properties via other material flow, defoaming, and rheology, a non-porous film is provided that is further capable of high gloss. It has been further recognized/discovered that certain alkyds provide a desirable balance of adhesion and cross-linking rate (dry time).

In various embodiments, double bonds on an oil chain crosslink to provide surface drying in forming a coating, and free hydroxyl (—OH) and carboxyl (—COOH) sites are provided on an alkyd polymer for metal adhesion and through drying, which contributes to final hardness development of the coating. A direct-to-metal resin provides a balance of functional sites and metal catalysis for substrate adhesion and fast drying.

As may be implemented in accordance with one or more embodiments, a water-based aerosol composition includes a water-based solvent, a waterborne alkyd polymer material in the solvent, and liquid propellant (e.g., dimethyl ether) for propelling the solvent and polymer material onto a surface. The waterborne alkyd polymer material operates with the solvent and propellant to inhibit surface oxidation upon delivery of the composition to the surface and curing of the polymer material thereon. Additional components such as those involving defoaming, flow enhancement and others may be included in the composition.

The waterborne alkyd polymer material may be modified in a variety of manners, to suit particular applications. In some embodiments, the waterborne alkyd polymer material is modified via copolymerization with a different polymer material, or with the same or different linear or branched polymer. Such a linear or branched polymer may include mixed units or grafted units on the waterborne alkyd polymer. In these and other contexts, the waterborne alkyd polymer may be a backbone chain and the mixed units may be side chains on the backbone chain. In certain embodiments, the waterborne alkyd polymer material is modified with material selected from the group of: an acrylic, urethane, epoxy, silicone, or a combination thereof.

In some embodiments, the water-based alkyd polymer is stabilized in an emulsion. Such an emulsion may include a material that stabilizes the water-based alkyd polymer via emulsion stabilization (e.g., steric or electrostatic), which may provide a sustained equilibrium of intermolecular forces. Such a stabilizing material may include one or more of ionic surfactants, nonionic surfactants, and a surfactant-free polymeric encapsulation.

In other embodiments, the water-based alkyd polymer is stabilized in a waterborne dispersion. The dispersion is made soluble in the water medium using the polymer's chemical function groups (e.g., an emulsion may be insoluble in the water phase, and utilize surfactants to maintain emulsion particle equilibrium and long-term stabilization). In certain implementations, such a dispersion is stable for a minimum of 1 year at standard conditions (77° F., 1 atmosphere), and for a minimum of 6 months at 120° F., 1 atmosphere.

Curing of the waterborne alkyd polymer material may involve crosslinking into a uniform protective film that prevents oxidation. For instance, such a cross-linked material may prevent corrosion propagation across an interface between the waterborne alkyd polymer and a surface upon which it is coated via chemical and physical adhesion. In some embodiments, the waterborne alkyd polymer material provides sites for metal adhesion, and utilizing the sites to adhere to and form a protective film on the surface, such as by providing free hydroxyl (—OH) and carboxyl (—COOH) sites for metal adhesion. Such approaches may utilize metal drier catalysts, such as oxidatively-cured natural drying oil and steric or electrostatic emulsion stabilization material.

Sustained equilibrium of an emulsion may be produced by using surfactants that orientate around the emulsion particles and present their chemical functional groups to the liquid medium via method of steric hindrance, electrostatic repulsion, or polymeric encapsulation to repel like emulsion particles. All three stabilization methods are capable of overcoming the natural van-der-Walls forces that would otherwise collapse the emulsion. In certain embodiments, such an emulsion is stable for a minimum of 1 year at standard conditions (77° F., 1 atmosphere), and for a minimum of 6 months at 120° F., 1 atmosphere.

In embodiments involving metal drier catalysts, a waterborne alkyd polymer material may be configured to cross-link using the metal drier catalysts to provide metal adhesion sites, as well as to increase molecular weight and covalent bond density of the water-based aerosol composition (e.g., relative to such a composition without such crosslinking). Certain embodiments involve a medium chain of soya oil alkyd stabilized via nonionic surfactants.

A variety of other constituents may be included with the water-based aerosol. In some embodiments, a polymeric material defoamer, a nonionic siloxane flow-enhancing material, and a Newtonian polyurethane material that imparts Newtonian flow rheology to the composition are included therewith.

Turning now to the figures, FIG. 1 shows a composition of matter 100 including an alkyd polymer, in accordance with one or more embodiments. An alkyd polymer material 110 is operable with a solvent and propellant for coating onto and curing on a surface. The cured alkyd polymer material is further configured to inhibit oxidation of the surface upon curing. In various embodiments, the alkyd polymer material 110 is functionalized with a side chain 120, or multiple side chains such as represented by side chains 121 and 122.

Figure 2:
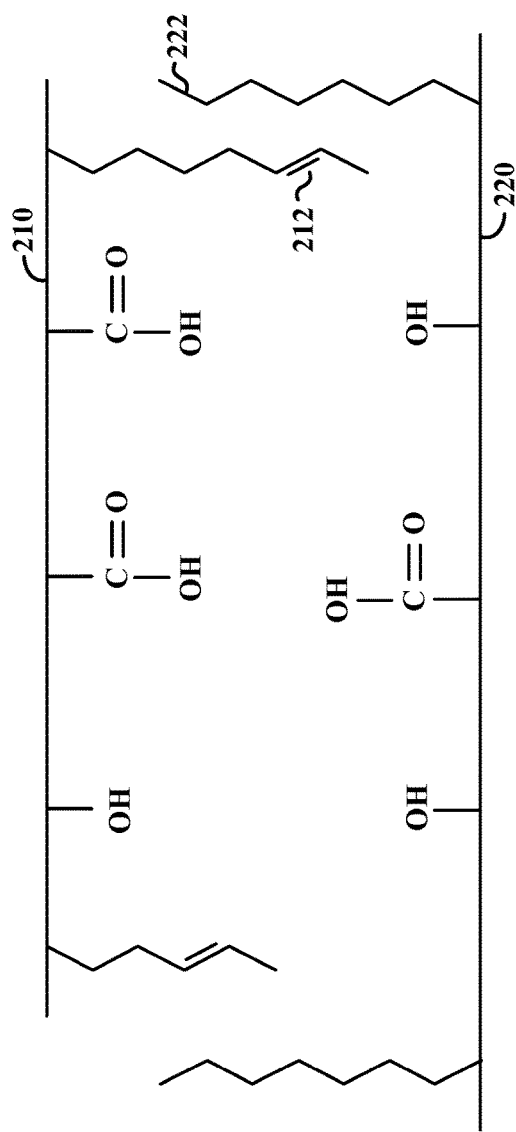

FIG. 2 shows a composition of matter 200 including an alkyd polymer 210 having respective double bond sites 212 for cross-linking. A further chain 220 is shown with drying agents 222, which facilitate adhesion.

A variety of materials may be utilized to facilitate desirable characteristics relating to flow, adhesion, dispersion, and resulting coating gloss. Tables 1.0, 1.1 and 1.2 below show water-based aerosol paint formulations, as may be implemented in accordance with one or more embodiments.

TABLE 1.0

| Composition (weight) | |
|---|---|
| Dimethyl ether | 41% |
| Water | 27.5% |
| Alkyd Polymer | 13.3% |
| Pigment | 9.7% |
| Co-solvent | 6.3% |
| Thickener | 1.2% |
| Surfactant | 0.6% |
| Drier | 0.4% |

TABLE 1.1

| Composition (weight) | |
|---|---|
| Dimethyl ether | 41% |
| Co-solvent | 28.8% |
| Alkyd Polymer | 14.4% |
| Water | 12.7% |
| Thickener | 1.8% |
| Surfactant | 0.5% |
| Drier | 0.5% |
| Pigment | 0.3% |

TABLE 1.2

| Composition (weight) | |
|---|---|
| Dimethyl ether | 41% |
| Alkyd Polymer | 16.3% |

TABLE 1.2-continued

| Composition (weight) | |
|---|---|
| Water | 12.7% |
| Co-solvent | 6.4% |
| Pigment | 3.2% |
| Thickener | 2.9% |
| Surfactant | 0.6% |
| Drier | 0.6% |

Dimethyl ether is utilized as a propellant, and water is the main ingredient thereafter. The amount of propellant facilitates expulsion from an aerosol can. The relatively high water content contributes to low odor and low MIR aspects of the paint formulation. The alkyd polymer backbone is provided at about 13%, with further ingredient compositions shown for pigment, polar co-solvent, thickener, coalescent and surfactant. These components can be modified in percentage to suit particular applications; however, it has been recognized/discovered that such a formulation facilitates desirable coating and rust inhibition characteristics.

Table 2 shows composition of an exemplary dry film achieved in accordance with one or more embodiments.

TABLE 2

| Element Number | Element Symbol | Element Name | Atomic Conc. | Weight Conc. |
|---|---|---|---|---|
| 6 | C | Carbon | 63.83 | 54.48 |
| 8 | O | Oxygen | 33.94 | 38.58 |
| 22 | Ti | Titanium | 1.81 | 6.17 |
| 13 | Al | Aluminum | 0.18 | 0.35 |
| 11 | Na | Sodium | 0.12 | 0.20 |
| 14 | Si | Silicon | 0.11 | 0.22 |

The compositional breakdown is reflected in major components (carbon and oxygen) of the alkyd polymer, with propellant and solvent evaporated. As such, the remaining film includes an alkyd polymer and inorganic pigment. Some trace silicon represents a flow additive.

Based upon the above discussion and illustrations, those skilled in the art will readily recognize that various modifications and changes may be made to the various embodiments without strictly following the exemplary embodiments and applications illustrated and described herein. For example, different materials may be utilized to achieve the indicated functions. Further components may be added to suit particular application needs. Such modifications do not depart from the true spirit and scope of various aspects of the invention, including aspects set forth in the claims.

What is claimed is:

1. A water-based aerosol composition comprising:
a solvent including water;
a metal drier catalyst;
a liquid propellant; and
a waterborne alkyd polymer material having a backbone stabilized in an emulsion or dispersion, the stabilized waterborne alkyd polymer material being configured and arranged with the solvent, metal drier catalyst and propellant to, upon delivery of the waterborne alkyd polymer material to a surface via the propellant:
utilize the metal drier catalyst to catalyze and crosslink a sidechain with the backbone to provide a crosslinked waterborne alkyd polymer including the sidechain while maintaining free hydroxyl (—OH) and carboxyl (—COOH) sites on the crosslinked waterborne alkyd polymer for metal adhesion; and
cure the crosslinked waterborne alkyd polymer on the surface, and inhibit oxidation of the surface by using the free hydroxyl (—OH) and carboxyl (—COOH) sites to effect metal adhesion with the surface.

2. The water-based aerosol composition of claim 1, wherein the waterborne alkyd polymer material is modified via copolymerization with a different polymeric material.

3. The water-based aerosol composition of claim 1, wherein the sidechain is a linear or branched polymer.

4. The water-based aerosol composition of claim 3, wherein the linear or branched polymer includes mixed units or grafted units on the crosslinked waterborne alkyd polymer.

5. The water-based aerosol composition of claim 3, wherein the crosslinked waterborne alkyd polymer is a backbone chain and the linear or branched polymer include mixed units as chains on the backbone chain.

6. The water-based aerosol composition of claim 1, wherein the waterborne alkyd polymer material is modified with material selected from the group of: an acrylic, urethane, epoxy, silicone, or a combination thereof.

7. The water-based aerosol composition of claim 1, wherein the liquid propellant includes dimethyl ether.

8. The water-based aerosol composition of claim 1, wherein the waterborne alkyd polymer material is stabilized in an emulsion.

9. The water-based aerosol composition of claim 8, wherein the emulsion includes a material configured and arranged to stabilize the waterborne alkyd polymer material via steric, electrostatic, or surfactant free polymeric encapsulation emulsion stabilization.

10. The water-based aerosol composition of claim 9, wherein said material configured and arranged to stabilize the waterborne alkyd polymer material is selected from the group of: ionic surfactants, nonionic surfactants, a surfactant-free polymeric encapsulation, and a combination thereof.

11. The water-based aerosol composition of claim 1, wherein the waterborne alkyd polymer material is stabilized in a waterborne dispersion.

12. The water-based aerosol composition of claim 1, wherein the waterborne alkyd polymer material is configured and arranged to crosslink into a uniform protective film that is configured and arranged to prevent oxidation.

13. The water-based aerosol composition of claim 1, wherein the waterborne alkyd polymer material is configured and arranged to, upon coating onto the surface, prevent corrosion propagation across an interface between the coated waterborne alkyd polymer and the surface via chemical and physical adhesion to the surface.

14. The water-based aerosol composition of claim 1, wherein the waterborne alkyd polymer material is configured and arranged to cure on the surface by utilizing the crosslinking to provide sites for metal adhesion, and utilizing the sites to adhere to and form a protective film on the surface.

15. The water-based aerosol composition of claim 1, wherein the waterborne alkyd polymer material is configured and arranged to crosslink using the metal drier catalyst to provide metal adhesion sites and to increase molecular weight and covalent bond density of the water-based aerosol composition.

16. The water-based aerosol composition of claim 1, wherein the waterborne alkyd polymer material is configured and arranged to form a protective film adhered to a metal surface via the free hydroxyl (—OH) and carboxyl (—COOH) sites and having a weight composition of 54.48% carbon, 38.58% oxygen, 6.17% titanium, 0.35% aluminum, 0.20% sodium, and 0.22% silicon.

17. The water-based aerosol composition of claim 1, wherein the waterborne alkyd polymer material includes oxidatively-cured natural drying oil and emulsion stabilization material that provide sustained equilibrium of intermolecular forces.

18. The water-based aerosol composition of claim 1, wherein the waterborne alkyd polymer material includes a medium chain of soya oil alkyd stabilized via nonionic surfactants.

19. The water-based aerosol composition of claim 1, further including:

a polymeric material configured and arranged to defoam the composition;

a nonionic siloxane material configured and arranged to facilitate fluidic flow of the composition; and a polyurethane configured and arranged to impart Newtonian flow rheology to the composition.

20. A method comprising:

utilizing a liquid propellant, spraying a water-based aerosol composition, including a solvent including water, a metal drier catalyst and a waterborne alkyd polymer material having a backbone and being stabilized in an emulsion or dispersion, onto a surface, and curing the water-based aerosol composition, including using the metal drier catalyst for curing and crosslinking a side chain to sites on the backbone of the waterborne alkyd polymer material while maintaining and using free hydroxyl (—OH) and carboxyl (—COOH) sites on the crosslinked waterborne alkyd polymer for metal adhesion, on the surface and inhibiting oxidation of the surface therewith.

* * * * *